United States Patent
Akatsuka et al.

(10) Patent No.: US 11,838,654 B2
(45) Date of Patent: Dec. 5, 2023

(54) REMOTE DRIVING SYSTEM

(71) Applicant: TOYOTA JIDOSHA KABUSHIKI KAISHA, Toyota (JP)

(72) Inventors: Kosuke Akatsuka, Mishima (JP); Yuki Murata, Toyota (JP); Shuichi Tamagawa, Kitanagoya (JP); Rio Suda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/852,717

(22) Filed: Jun. 29, 2022

(65) Prior Publication Data

US 2023/0027809 A1 Jan. 26, 2023

(30) Foreign Application Priority Data

Jul. 14, 2021 (JP) ................................ 2021-116532

(51) Int. Cl.
*H04N 23/951* (2023.01)
*H04N 23/611* (2023.01)
*G05D 1/00* (2006.01)
*H04N 23/90* (2023.01)

(52) U.S. Cl.
CPC ......... *H04N 23/951* (2023.01); *G05D 1/0016* (2013.01); *G05D 1/0038* (2013.01); *H04N 23/611* (2023.01); *H04N 23/90* (2023.01); *G05D 2201/0213* (2013.01)

(58) Field of Classification Search
CPC .... H04N 23/951; H04N 23/611; H04N 23/90; G05D 1/0016; G05D 1/0038; G05D 2201/0213; G05D 1/0022
See application file for complete search history.

(56) References Cited

U.S. PATENT DOCUMENTS

| 1,135,013 | A | * | 4/1915 | Haag | ..................... | E21D 21/008 |
|---|---|---|---|---|---|---|
| | | | | | | 405/259.1 |
| 2017/0072851 | A1 | * | 3/2017 | Shenoy | .................. | G08G 1/164 |
| 2018/0357752 | A1 | * | 12/2018 | Ho | ......................... | G09G 5/377 |
| 2020/0356108 | A1 | * | 11/2020 | Toma | ........................ | G08G 1/04 |
| 2022/0078350 | A1 | * | 3/2022 | Kanma | ................ | H04N 23/661 |
| 2022/0132029 | A1 | * | 4/2022 | Watanabe | .............. | H04N 23/80 |

FOREIGN PATENT DOCUMENTS

JP              6581844 B2    9/2019

* cited by examiner

*Primary Examiner* — Hung H Lam
(74) *Attorney, Agent, or Firm* — Sughrue Mion, PLLC

(57) ABSTRACT

A remote driving system includes: an acquisition unit for acquiring operation information related to an operation of a steering wheel by a user who remotely drives the target vehicle; and a control unit for controlling a resolution and a frame rate of each camera mounted on the target vehicle. When an operation amount of the steering wheel is relatively small, at least one of the resolution and the frame rate of a camera that captures an image of a front region of the target vehicle in a traveling direction is maintained or improved. When the steering wheel has been rotated to one of right and left and the operation amount is relatively large, at least one of the resolution and the frame rate of a camera that captures an image of a region of the one of right and left of the target vehicle is maintained or improved.

7 Claims, 6 Drawing Sheets

FIG. 1
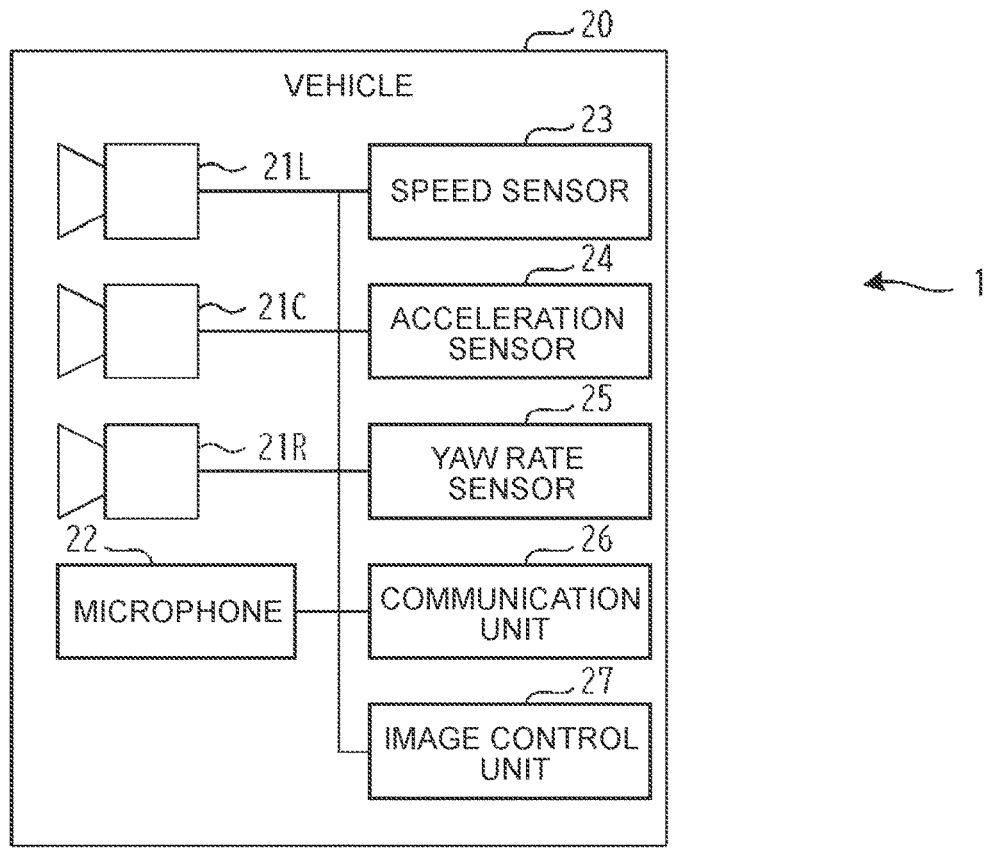
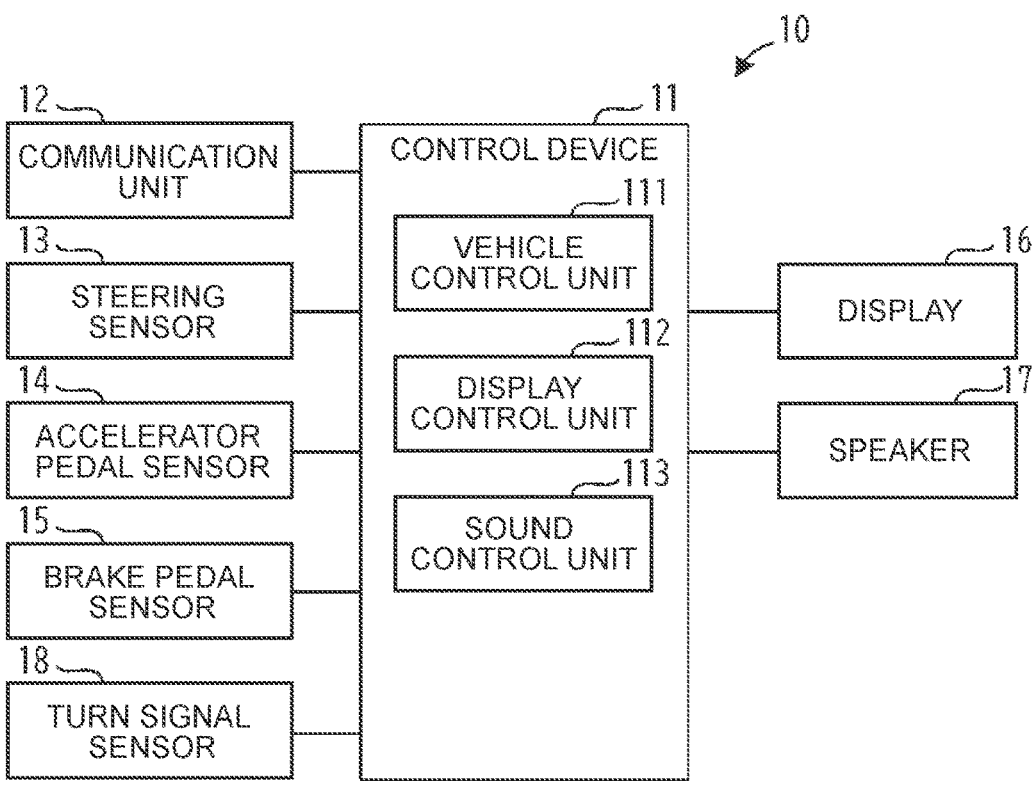

REMOTE DRIVING SYSTEM

CROSS-REFERENCE TO RELATED APPLICATION

This application claims priority to Japanese Patent Application No. 2021-116532 filed on Jul. 14, 2021, incorporated herein by reference in its entirety.

BACKGROUND

1. Technical Field

The present disclosure relates to a technical field of a remote driving system for remotely driving a target vehicle.

2. Description of Related Art

As this type of system, for example, there has been proposed a system that remotely controls a construction machine by transmitting a control signal from a control device to the construction machine via a radio base station and that transmits images taken by cameras mounted on the construction machine from the construction machine to the control device via the radio base station (see Japanese Patent No. 6581844 (JP 6581844 B)). In this system, when an increase in the amount of video data is expected according to the behavior of the construction machine, the resolution and the frame rate of the video are reduced to reduce the amount of video data.

SUMMARY

The technique described in JP 6581844 B focuses on suppressing an increase in the amount of video data, and uniformly sets the resolution and the frame rate of a plurality of cameras mounted on a construction machine. For example, when the resolution and the frame rate are uniformly reduced, the time required for the user performing remote control to grasp the necessary information from the displayed images may increase. That is, there is a technical issue that the operability related to remote control may be deteriorated due to the resolution and the frame rate of the cameras.

The present disclosure has been made in view of the above issue, and an object of the present disclosure is to provide a remote driving system capable of suppressing a communication amount while suppressing deterioration in operability related to remote control.

A remote driving system according to one aspect of the present disclosure is a remote driving system for remotely driving a target vehicle. The remote driving system includes: an acquisition unit for acquiring operation information related to an operation of a steering wheel by a user who remotely drives the target vehicle; and a control unit for controlling, according to the operation information, at least one of a resolution and a frame rate of each of a plurality of cameras mounted on the target vehicle. When an operation amount of the steering wheel indicated by the operation information is relatively small, the control unit maintains or improves at least one of the resolution and the frame rate of a camera that captures an image of a front region of the target vehicle in a traveling direction among the cameras. When the operation information indicates that the steering wheel has been rotated to one of right and left and the operation amount is relatively large, the control unit maintains or improves at least one of the resolution and the frame rate of a camera that captures an image of a region of the one of right and left of the target vehicle among the cameras.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 1 is a block diagram showing a configuration of a remote driving system according to a first embodiment;

DETAILED DESCRIPTION OF EMBODIMENTS

First Embodiment

Figure 2:
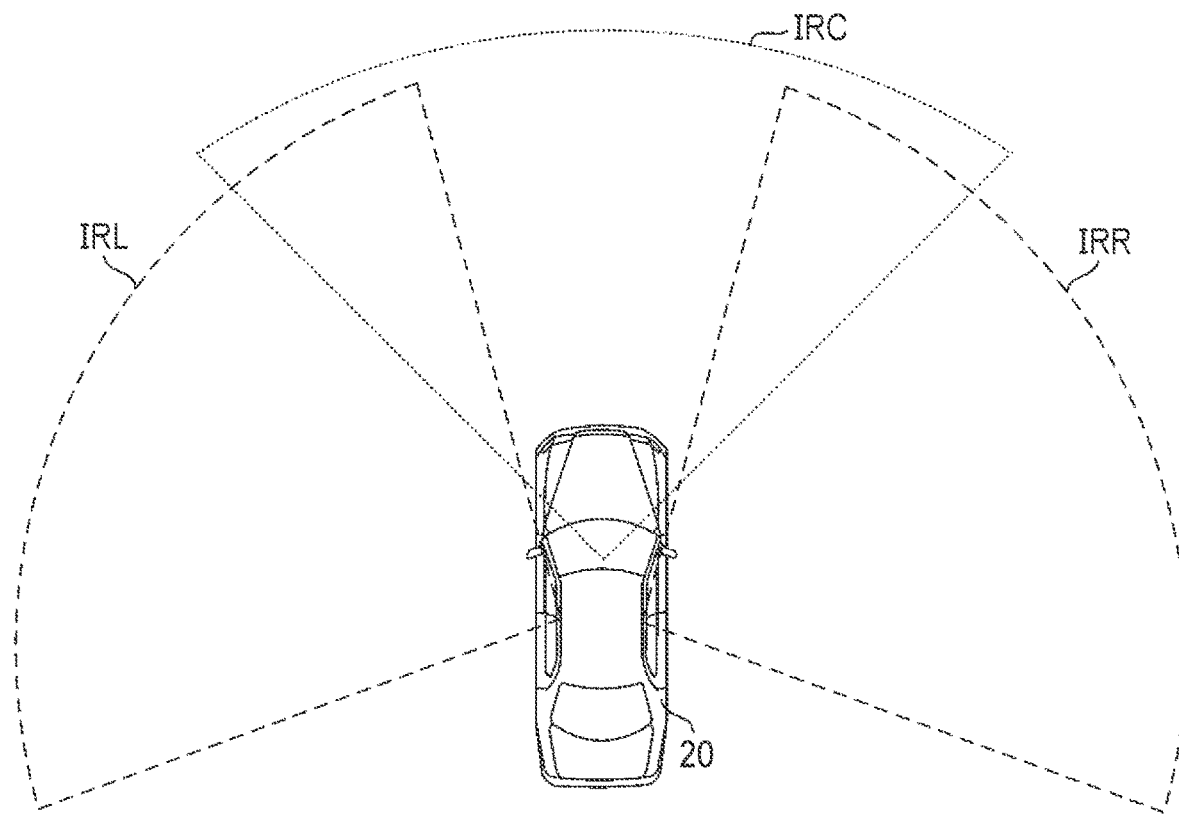
FIG. 2 is a diagram showing an example of imaging ranges of cameras of a vehicle according to the first embodiment.

A first embodiment related to a remote driving system will be described with reference to FIGS. 1 to 4. In FIG. 1, a remote driving system 1 includes a remote driving device 10 and a vehicle 20 that is remotely driven by the remote driving device 10.

The remote driving device 10 is made as a mockup of a cockpit of a vehicle, for example. The remote driving device 10 includes a steering wheel, an accelerator pedal, a brake pedal, and a turn signal lever (none of which are shown) operated by a user who remotely drives the target vehicle (here, the vehicle 20) using the remote driving device 10.

The remote driving device 10 includes a control device 11, a communication unit 12, a steering sensor 13, an accelerator pedal sensor 14, a brake pedal sensor 15, a display 16, a speaker 17, and a turn signal sensor 18. The steering sensor 13 detects the amount of operation of the steering wheel. The accelerator pedal sensor 14 detects the amount of operation of the accelerator pedal. The brake pedal sensor 15 detects the operation amount of the brake pedal. The turn signal sensor 18 detects the state of the turn signal lever.

The vehicle 20 includes cameras 21L, 21C, and 21R, a microphone 22, a speed sensor 23, an acceleration sensor 24, a yaw rate sensor 25, a communication unit 26, and an image control unit 27.

The microphone 22 detects the sound around the vehicle 20 (hereinafter referred to as "external environmental sound"). The speed sensor 23 detects the speed of the vehicle 20. The acceleration sensor 24 detects the acceleration of the vehicle 20. The yaw rate sensor 25 detects the yaw rate of the vehicle 20. The external environmental sound detected by the microphone 22, the speed detected by the speed sensor 23, the acceleration detected by the acceleration sensor 24, and the yaw rate detected by the yaw rate sensor 25 are transmitted to the remote driving device 10 via the communication unit 26.

The camera 21C is mounted on the vehicle 20 so that the front region of the vehicle 20 can be imaged. The camera 21L is mounted on the vehicle 20 so that the left side region of the vehicle 20 can be imaged. The camera 21R is mounted on the vehicle 20 so that the right side region of the vehicle 20 can be imaged. The images captured by each of the cameras 21L, 21C, and 21R are transmitted to the remote driving device 10 via the communication unit 26.

The image control unit 27 is configured to be able to set the resolution and the frame rate of each of the cameras 21L, 21C, and 21R. The cameras 21L, 21C, and 21R each capture a corresponding region at the resolution and the frame rate set by the image control unit 27. Since various existing modes can be applied to the specific method of changing the resolution and the frame rate of the cameras 21L, 21C, and 21R, the detailed description thereof will be omitted.

Here, in FIG. 2, the range IRL corresponds to the imaging range of the camera 21L, the range IRC corresponds to the imaging range of the camera 21C, and the range IRR corresponds to the imaging range of the camera 21R. In addition to the cameras 21L, 21C, and 21R, the vehicle 20 may be provided with another camera such as a camera capable of imaging the rear region of the vehicle 20.

The control device 11 of the remote driving device 10 includes a vehicle control unit 111, a display control unit 112, and a sound control unit 113 as logical blocks that are logically realized inside the remote driving device 10 or as processing circuits that are physically realized.

The vehicle control unit 111 acquires via the communication unit 12 the speed, acceleration, and yaw rate transmitted from the vehicle 20. The vehicle control unit 111 calculates a command value for controlling the vehicle 20 based on the acquired speed, acceleration and yaw rate, the operation amount detected by the steering sensor 13, the operation amount detected by the accelerator pedal sensor 14, and the operation amount detected by the brake pedal sensor 15. The vehicle control unit 111 transmits the calculated command value to the vehicle 20 via the communication unit 12.

The vehicle control unit 111 transmits to the vehicle 20 via the communication unit 12 the steering information indicating the operation amount detected by the steering sensor 13 and the turn signal information indicating the state of the turn signal lever detected by the turn signal sensor 18.

Figure 3:
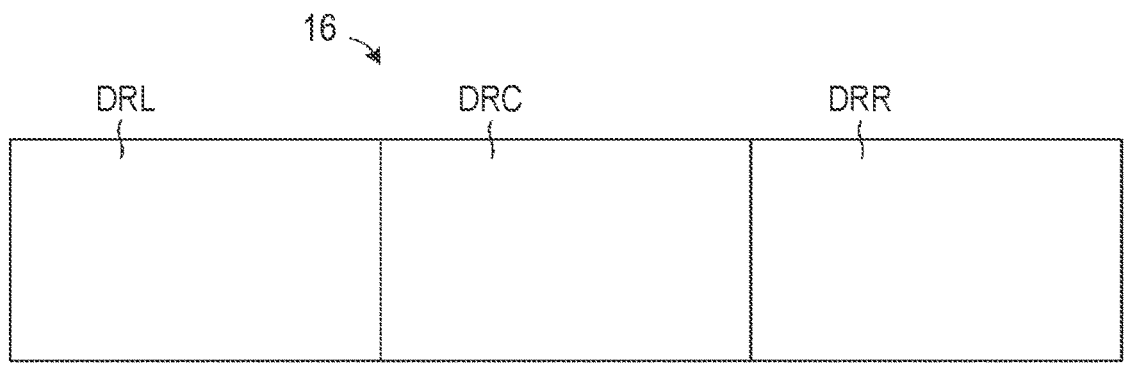
FIG. 3 is a diagram showing an example of a display according to the first embodiment.

The display control unit 112 acquires via the communication unit 12 images captured by each of the cameras 21L, 21C, and 21R. Here, the display 16 has display areas DRL, DRC, and DRR, as shown in FIG. 3, for example. The display control unit 112 displays images captured by the camera 21L in the display area DRL, displays images captured by the camera 21C in the display area DRC, and displays images captured by the camera 21R in the display area DRR.

It should be noted that each of the display areas DRL, DRC, and DRR may be realized as a partial area within one display. Alternatively, the display areas DRL, DRC, and DRR may be realized by multiple (for example, three) displays. Further, instead of individually displaying the images captured by each of the cameras 21L, 21C, and 21R, the display control unit 112 may synthesize the images captured by each of the cameras 21L, 21C, and 21R, and then display the synthesized images on the display 16.

The sound control unit 113 acquires via the communication unit 12 the external environmental sound transmitted from the vehicle 20. The sound control unit 113 controls the speaker 17 so that the acquired external environmental sound is emitted.

The communication capacity (or the communication channel capacity) between the remote driving device 10 and the vehicle 20 changes depending on, for example, a time zone, a place, or the like. Since the amount of data of the images captured by each of the cameras 21L, 21C, and 21R is relatively large, if the communication capacity is relatively small, the images may not be properly transmitted from the vehicle 20 to the remote driving device 10.

Therefore, the image control unit 27 determines the priority of the images captured by each of the cameras 21L, 21C, and 21R. Then, the image control unit 27 sets the resolution and the frame rate of each of the cameras 21L, 21C, and 21R according to the determined priority. The operation of the image control unit 27 will be specifically described with reference to the flowchart of FIG. 4.

Figure 4:
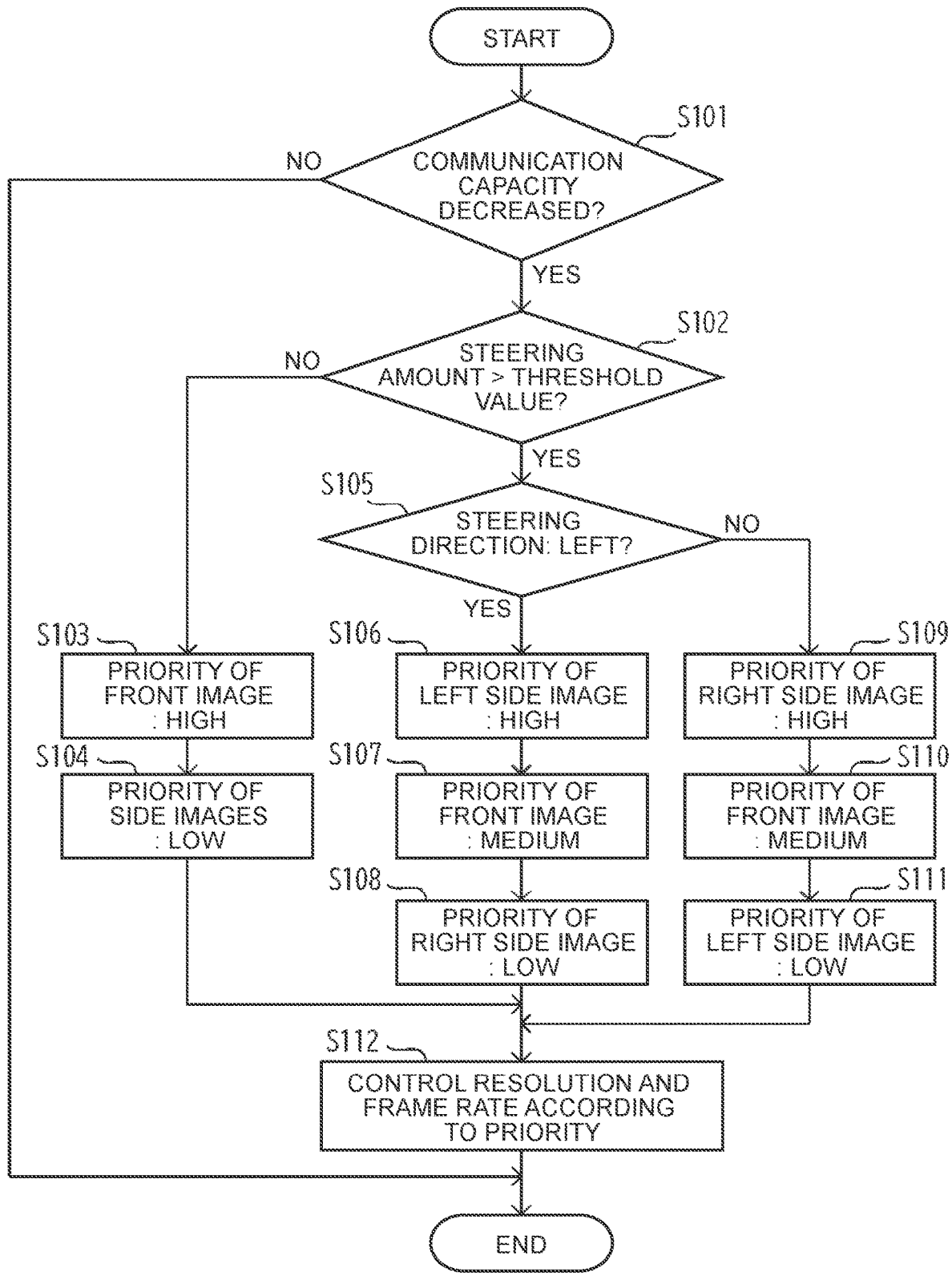
FIG. 4 is a flowchart showing an operation of the remote driving system according to the first embodiment.

In FIG. 4, the image control unit 27 determines whether the communication capacity between the vehicle 20 and the remote driving device 10 has decreased (step S101). In the process of step S101, the image control unit 27 may determine that the communication capacity has decreased when the communication capacity becomes smaller than a predetermined communication capacity threshold value.

Since various existing modes can be applied to the method for measuring the communication capacity, the detailed description thereof will be omitted. The communication capacity does not have to be measured sequentially. For example, the image control unit 27 may estimate the current communication capacity by referring to a map that defines the relationship between the time zone and the communication capacity. Alternatively, the image control unit 27 may estimate the communication capacity at the current position of the vehicle 20 by referring to a map that defines the relationship between the position and the communication capacity.

When it is determined in the process of step S101 that the communication capacity has not decreased (step S101: No), the operation shown in FIG. 4 is terminated. Then, after a predetermined time has elapsed, the process of step S101 may be performed. That is, the operation shown in FIG. 4 may be repeated at a cycle according to a predetermined time.

When it is determined in the process of step S101 that the communication capacity has decreased (step S101: Yes), the image control unit 27 determines whether the operation amount of the steering wheel indicated by the steering information acquired via the communication unit 26 (hereinafter appropriately referred to as "steering amount") is larger than a predetermined steering amount threshold value (step S102).

Here, the "steering amount threshold value" is a value that determines whether the vehicle 20 is traveling straight or turning, and is set in advance as a fixed value or as a variable value according to some physical quantity or parameter. Such a "steering amount threshold value" may be set empirically, experimentally, or by simulation, based on the relationship between the steering amount and the degree of deflection of the vehicle 20, for example.

When it is determined in the process of step S102 that the steering amount is smaller than the predetermined steering amount threshold value (step S102: No), the image control unit 27 determines that the vehicle 20 is traveling straight. In this case, the image control unit 27 sets the priority of the image captured by the camera 21C (hereinafter appropriately referred to as "front image") displayed in the display area DRC (see FIG. 3) of the display 16 to "high" (step S103). The image control unit 27 sets the priority of the image captured by the camera 21L (hereinafter appropriately referred to as "left side image") displayed in the display area DRL of the display 16 and the priority of the image captured by the camera 21R (hereinafter appropriately referred to as "right side image") displayed in the display area DRR of the display 16 to "low" (step S104).

After that, the image control unit 27 sets the resolution and the frame rate of the cameras 21L, 21C, and 21R according to the priority set in the processes of steps S103 and S104 (step S112). In this case, the image control unit 27 maintains at least the resolution and the frame rate of the camera 21C. On the other hand, the image control unit 27 reduces at least one of the resolution and the frame rate of the camera 21L and reduces at least one of the resolution and the frame rate of the camera 21R.

If there is a margin in the communication capacity due to the reduction in at least one of the resolution and the frame rate of the cameras 21L and 21R, the image control unit 27 may improve at least one of the resolution and the frame rate of the camera 21C.

In the process of step S102, when the steering amount is larger than the predetermined steering amount threshold value (step S102: Yes), the image control unit 27 determines whether the steering direction indicated by the steering information acquired via the communication unit 26 is left (step S105). In the process of step S102, when the steering amount is "equal to" the predetermined steering amount threshold value, either case may be selected.

When it is determined in the process of step S105 that the steering direction is left (step S105: Yes), the image control unit 27 determines that the vehicle 20 is turning left. In this case, the image control unit 27 sets the priority of the left side image to "high" (step S106). The image control unit 27 sets the priority of the front image to "medium" (step S107). The image control unit 27 sets the priority of the right side image to "low" (step S108).

After that, the image control unit 27 sets the resolution and the frame rate of the cameras 21L, 21C, and 21R according to the priority set in the processes of steps S106, S107, and S108 (step S112). In this case, the image control unit 27 maintains at least the resolution and the frame rate of the camera 21L. The image control unit 27 maintains the resolution and the frame rate of the camera 21C. The image control unit 27 reduces at least one of the resolution and the frame rate of the camera 21R.

If there is a margin in the communication capacity due to the reduction in at least one of the resolution and the frame rate of the camera 21R, the image control unit 27 may improve at least one of the resolution and the frame rate of the camera 21L. On the other hand, if the communication capacity is insufficient even though both the resolution and the frame rate of the camera 21R are reduced, the image control unit 27 may further reduce at least one of the resolution and the frame rate of the camera 21C.

When it is determined in the process of step S105 that the steering direction is not left (that is, the steering direction is right) (step S105: No), the image control unit 27 determines that the vehicle 20 is turning right. In this case, the image control unit 27 sets the priority of the right side image to "high" (step S109). The image control unit 27 sets the priority of the front image to "medium" (step S110). The image control unit 27 sets the priority of the left side image to "low" (step S111).

After that, the image control unit 27 sets the resolution and the frame rate of the cameras 21L, 21C, and 21R according to the priority set in the processes of steps S109, S110, and S111 (step S112). In this case, the image control unit 27 maintains at least the resolution and the frame rate of the camera 21R. The image control unit 27 maintains the resolution and the frame rate of the camera 21C. The image control unit 27 reduces at least one of the resolution and the frame rate of the camera 21L.

If there is a margin in the communication capacity due to the reduction in at least one of the resolution and the frame rate of the camera 21L, the image control unit 27 may improve at least one of the resolution and the frame rate of the camera 21R. On the other hand, if the communication capacity is insufficient even though both the resolution and the frame rate of the camera 21L are reduced, the image control unit 27 may further reduce at least one of the resolution and the frame rate of the camera 21C.

Technical Effect

When the vehicle 20 is traveling straight, the user who remotely drives the vehicle 20 by the remote driving device 10 often gazes at the front image. In the remote driving system 1, when the communication capacity is reduced while the vehicle 20 is traveling straight, at least the resolution and the frame rate of the camera 21C are maintained. Therefore, the image quality of the front image, which is often gazed at by the user, does not deteriorate. On the other hand, at least one of the resolution and the frame rate of the cameras 21L and 21R is reduced. Therefore, the total amount of data transmitted from the vehicle 20 to the remote driving device 10 can be reduced.

When the vehicle 20 is turning left, the user often gazes at the diagonally left front, which is the traveling direction of the vehicle 20. In the remote driving system 1, when the communication capacity is reduced while the vehicle 20 is turning left, at least the resolution and the frame rate of the camera 21L are maintained. Therefore, the image quality of the left side image, which is often gazed at by the user, does not deteriorate. On the other hand, at least one of the resolution and the frame rate of the camera 21R is reduced. Therefore, the total amount of data transmitted from the vehicle 20 to the remote driving device 10 can be reduced.

When the vehicle 20 is turning right, the user often gazes at the diagonally right front, which is the traveling direction of the vehicle 20. In the remote driving system 1, when the communication capacity is reduced while the vehicle 20 is turning right, at least the resolution and the frame rate of the camera 21R are maintained. Therefore, the image quality of the right side image, which is often gazed at by the user, does not deteriorate. On the other hand, at least one of the resolution and the frame rate of the camera 21L is reduced. Therefore, the total amount of data transmitted from the vehicle 20 to the remote driving device 10 can be reduced.

As described above, according to the remote driving system 1, it is possible to suppress the communication amount while suppressing the deterioration of the operability related to remote driving by the remote driving device 10.

Second Embodiment

A second embodiment related to a remote driving system will be described with reference to FIG. 5. The second embodiment is similar to the first embodiment described above, except that the operation of the image control unit 27 is partially different. Therefore, the description of the second embodiment that overlaps with that of the first embodiment will be omitted as appropriate, the same parts on the drawings will be indicated by the same reference signs, and differences from the first embodiment will be described with reference to FIG. 5.

Figure 5:
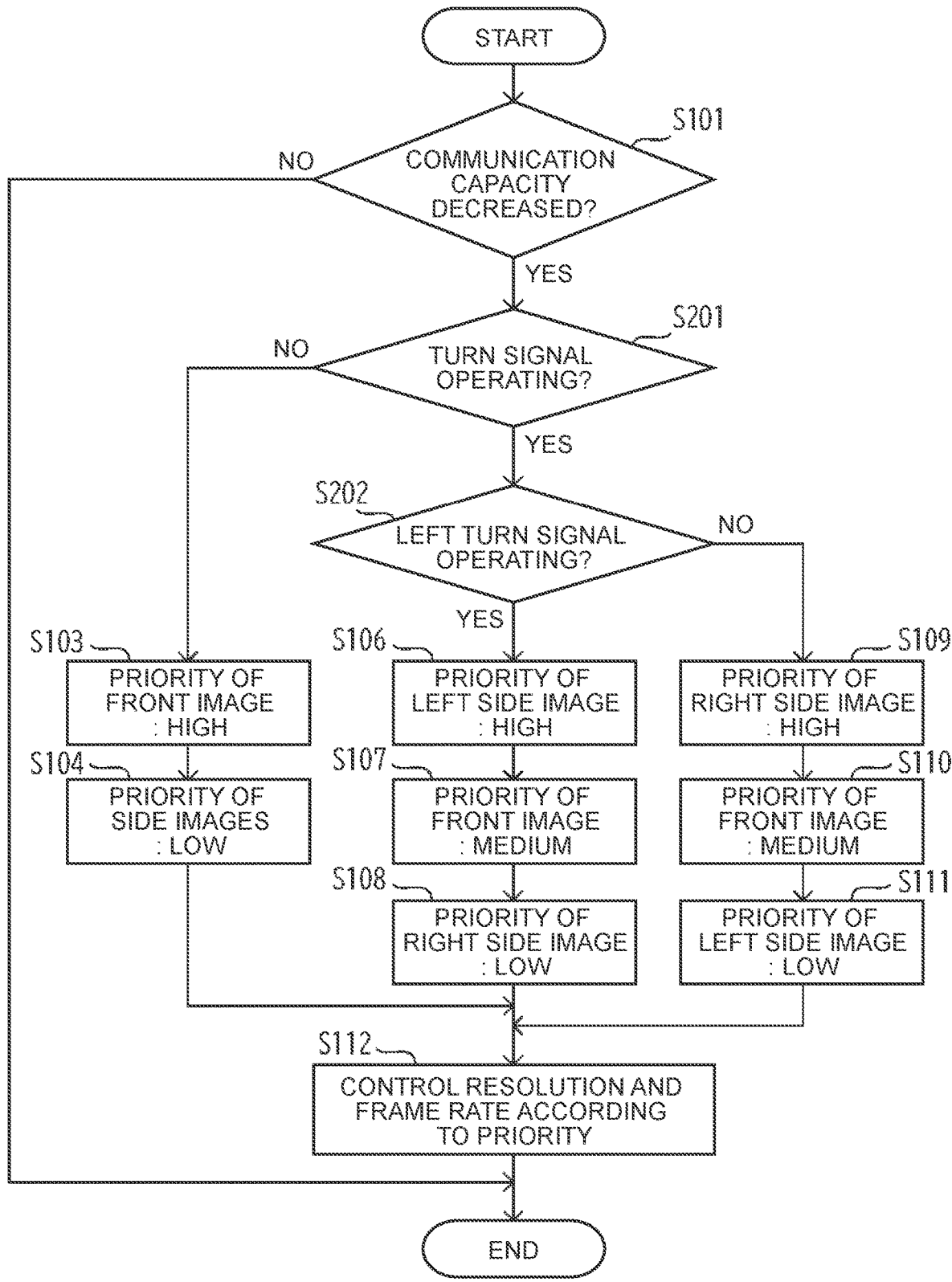
FIG. 5 is a flowchart showing an operation of a remote driving system according to a second embodiment.

In FIG. 5, when it is determined that the communication capacity has decreased (step S101: Yes), the image control unit 27 determines whether the turn signal is operating based on the state of the turn signal lever indicated by the turn signal information acquired via the communication unit 26 (step S201). When it is determined in the process of step S201 that the turn signal is not operating (step S201: No), the processes of step S103 and after are performed.

When it is determined in the process of step S201 that the turn signal is operating (step S201: Yes), the image control unit 27 determines whether the left turn signal is operating (step S202). In the process of step S202, when it is determined that the left turn signal is operating (step S202: Yes), the processes of step S106 and after are performed.

When it is determined in the process of step S202 that the left turn signal is not operating (that is, the right turn signal is operating) (step S202: No), the processes of step S109 and after are performed.

Technical Effect

With the remote driving system 1 according to the second embodiment, as in the first embodiment described above, it is possible to suppress the communication amount while suppressing the deterioration of the operability related to remote driving by the remote driving device 10.

Third Embodiment

A third embodiment related to a remote driving system will be described with reference to FIG. 6. The third embodiment is similar to the first embodiment described above, except that the operation of the remote driving system 1 is partially different. Therefore, the description of the third embodiment that overlaps with that of the first embodiment will be omitted as appropriate, the same parts on the drawings will be indicated by the same reference signs, and differences from the first embodiment will be described with reference to FIG. 6.

Figure 6:
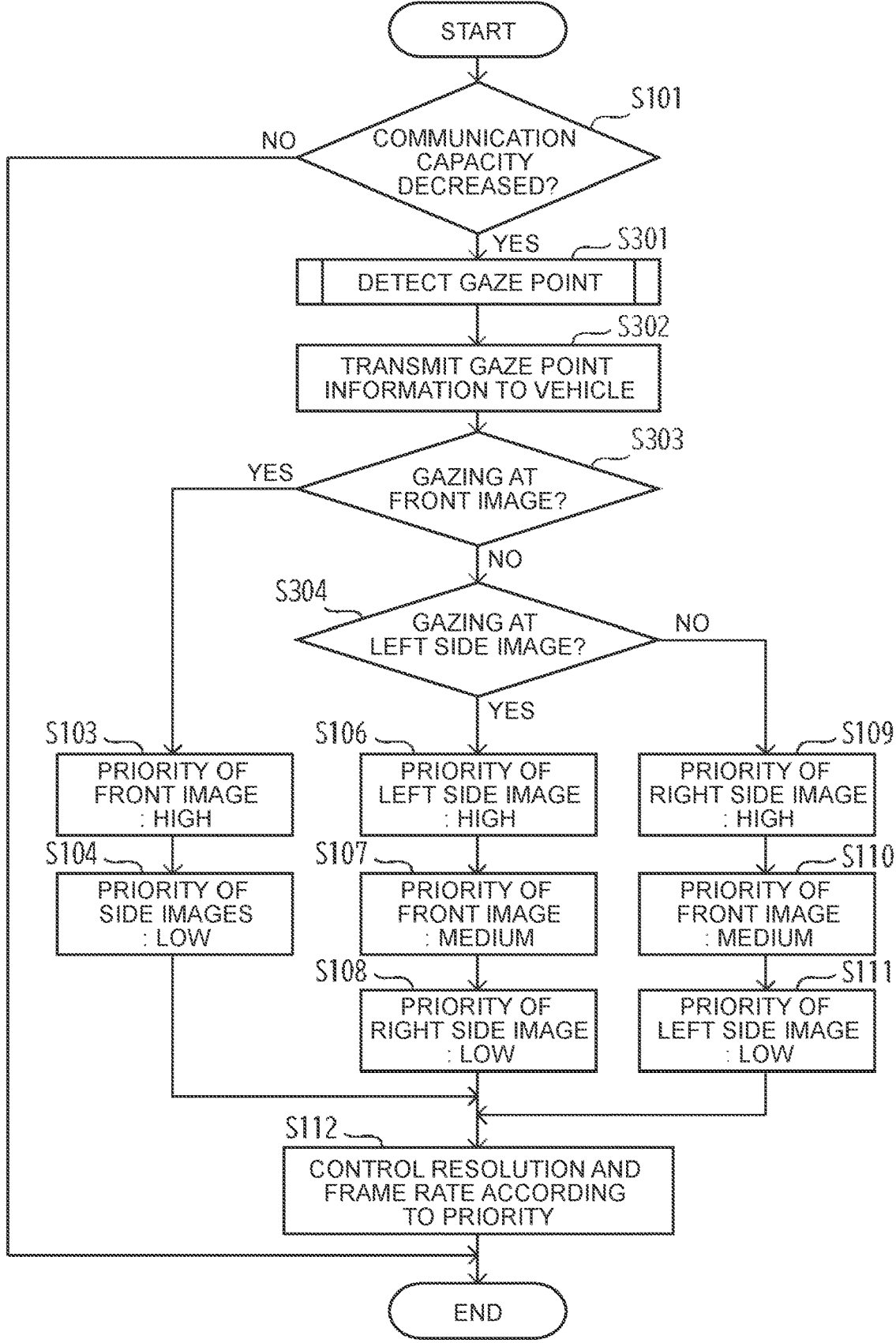
FIG. 6 is a flowchart showing an operation of a remote driving system according to a third embodiment.

In FIG. 6, when it is determined that the communication capacity has decreased (step S101: Yes), the vehicle control unit 111 of the remote driving device 10 detects the gaze point of the user who remotely drives the vehicle 20 by the remote driving device 10 (step S301). Since various existing modes can be applied to the method for detecting the gaze point, the detailed description thereof will be omitted.

The vehicle control unit 111 transmits the gaze point information indicating the detected gaze point to the vehicle 20 via the communication unit 12 (step S302). The processes of steps S301 and S302 may be performed at all times, and not only when the communication capacity has decreased.

The image control unit 27 that has acquired the gaze point information via the communication unit 26 of the vehicle 20 determines whether the user is gazing at the front image based on the gaze point information (step S303). In the process of step S303, when it is determined that the user is gazing at the front image (step S303: Yes), the processes of step S103 and after are performed.

When it is determined in the process of step S303 that the user is not gazing at the front image (step S303: No), the image control unit 27 determines whether the user is gazing at the left side image (step S304). In the process of step S304, when it is determined that the user is gazing at the left side image (step S304: Yes), the processes of step S106 and after are performed.

In the process of step S304, when it is determined that the user is not gazing at the left side image (that is, the user is gazing at the right side image) (step S304: No), the processes of step S109 and after are performed.

Technical Effect

With the remote driving system 1 according to the third embodiment, as in the first embodiment described above, it is possible to suppress the communication amount while suppressing the deterioration of the operability related to remote driving by the remote driving device 10.

Fourth Embodiment

A fourth embodiment related to a remote driving system will be described with reference to FIG. 7. The fourth embodiment is similar to the first embodiment described above, except that the operation of the image control unit 27 is partially different. Therefore, the description of the fourth embodiment that overlaps with that of the first embodiment will be omitted as appropriate, and differences from the first embodiment will be described with reference to FIG. 7.

Figure 7:
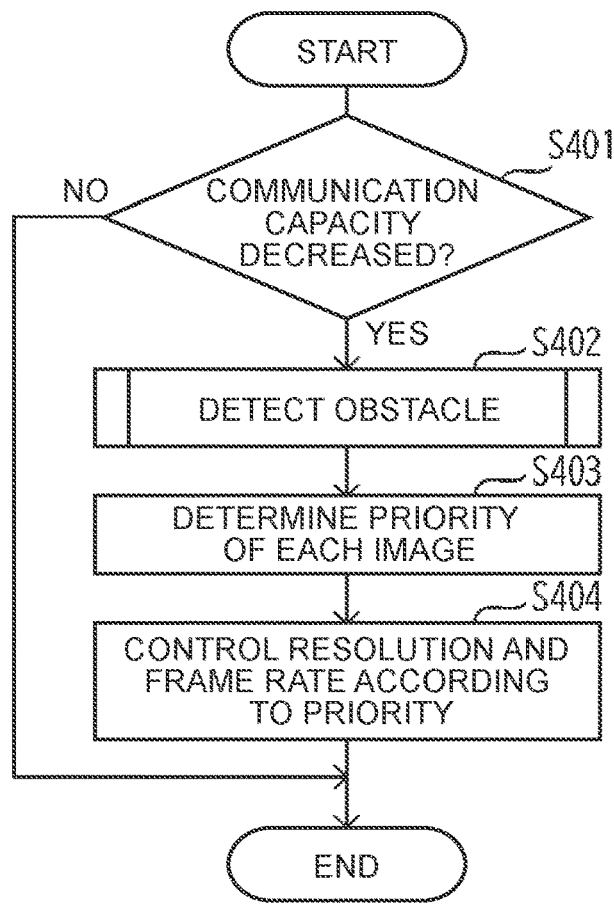
FIG. 7 is a flowchart showing an operation of a remote driving system according to a fourth embodiment.

In FIG. 7, the image control unit 27 determines whether the communication capacity between the vehicle 20 and the remote driving device 10 has decreased (step S401). The process of step S401 corresponds to the process of step S101 described above.

When it is determined in the process of step S401 that the communication capacity has not decreased (step S401: No), the operation shown in FIG. 7 is terminated. Then, after a predetermined time has elapsed, the process of step S401 may be performed. That is, the operation shown in FIG. 7 may be repeated at a cycle according to a predetermined time.

When it is determined in the process of step S401 that the communication capacity has decreased (step S401: Yes), the image control unit 27 detects an obstacle from the images captured by each of the cameras 21L, 21C, and 21R (step S402). The "obstacle" means an object having a relatively large influence on driving of the vehicle 20, such as a pedestrian, a bicycle, another vehicle, a fallen object on the road, or the like. Since various existing modes can be applied to the method for detecting the object, the detailed description thereof will be omitted.

Next, the image control unit 27 determines the priority of each image (that is, the front image, the left side image, and the right side image) according to the detection result of the obstacle in the process of step S402 (step S403). Specifically, the image control unit 27 raises the priority of the image in which the obstacle is shown, while lowering the priority of the image in which the obstacle is not shown. When a plurality of obstacles is detected, the image control unit 27 may give higher priority to the image having more obstacles, for example. Further, when a plurality of obstacles is detected, the image control unit 27 may determine the priority of each image according to the type of the obstacle that is shown, for example.

After that, the image control unit 27 sets the resolution and the frame rate of the cameras 21L, 21C, and 21R according to the priority determined in the processes of steps S403 (step S404).

Technical Effect

With the remote driving system 1 according to the fourth embodiment, as in the first embodiment described above, it is possible to suppress the communication amount while suppressing the deterioration of the operability related to remote driving by the remote driving device 10.

The mode according to the fourth embodiment may be combined with the mode according to any one of the first to third embodiments described above. In other words, the image control unit 27 may determine the priority of each image based on at least one of the steering information, the turn signal information, and the gaze point information in addition to the obstacle detected in the process of step S402.

Computer Program

Figure 8:
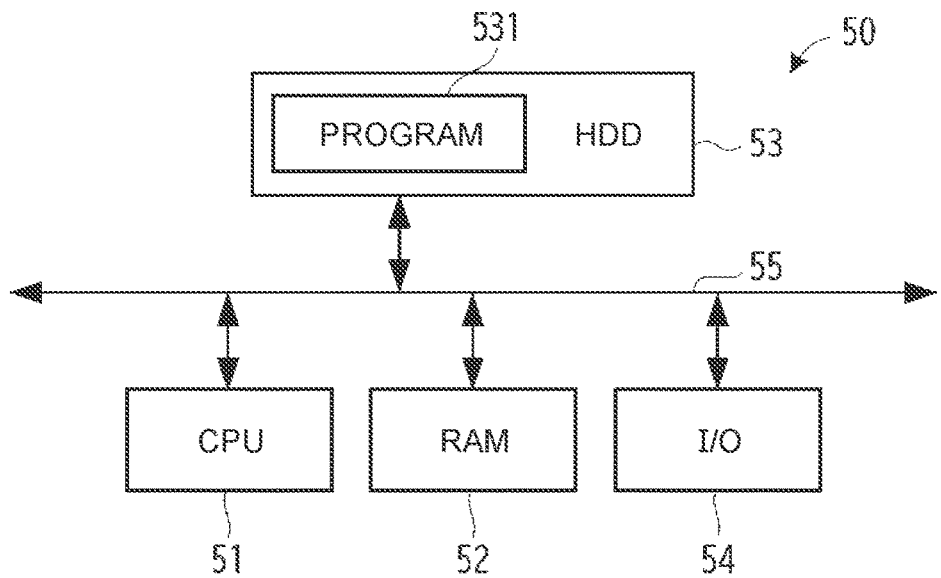
FIG. 8 is a block diagram showing a configuration of a computer according to an embodiment.

An embodiment of a computer program will be described with reference to FIG. 8. FIG. 8 is a block diagram showing a configuration of a computer according to an embodiment.

In FIG. 8, a computer 50 constitutes a part of the vehicle 20 serving as the target vehicle for remote driving. The computer 50 includes a central processing unit (CPU) 51, a random access memory (RAM) 52, a hard disk drive (HDD) 53, and an input/output (I/O) 54. The CPU 51, the RAM 52, the HDD 53, and the I/O 54 are connected to each other by a bus 55. A computer program 531 according to the present embodiment is stored in the HDD 53 in advance. The communication unit 26 described above may be configured by the I/O 54.

The processing of the CPU 51 by the computer program 531 will be described. The CPU 51 acquires via the I/O 54, for example, the steering information, the turn signal information, the gaze point information, and the like transmitted from the remote driving device 10.

The CPU 51 determines whether the communication capacity between the vehicle 20 and the remote driving device 10 has decreased. When it is determined that the communication capacity has decreased, the CPU 51 may determine the priority of each of the above-mentioned front image, left side image, and right side image based on the steering information. Then, the CPU 51 may set the resolution and the frame rate of the cameras 21L, 21C, and 21R according to the determined priority.

When it is determined that the communication capacity has decreased, the CPU 51 may determine the priority of each of the above-mentioned front image, left side image, and right side image based on the turn signal information. Then, the CPU 51 may set the resolution and the frame rate of the cameras 21L, 21C, and 21R according to the determined priority.

When it is determined that the communication capacity has decreased, the CPU 51 may determine the priority of each of the above-mentioned front image, left side image, and right side image based on the gaze point information. Then, the CPU 51 may set the resolution and the frame rate of the cameras 21L, 21C, and 21R according to the determined priority.

When it is determined that the communication capacity has decreased, the CPU 51 may detect the obstacle from the images captured by each of the cameras 21L, 21C, and 21R. The CPU 51 may determine the priority of each of the above-mentioned front image, left side image, and right side image according to the detection result of the obstacle. Then, the CPU 51 may set the resolution and the frame rate of the cameras 21L, 21C, and 21R according to the determined priority.

The computer program 531 may be stored in the HDD 53 when the computer 50 reads the computer program 531 from a recording medium such as an optical disk including a compact disc read only memory (CD-ROM) and a universal serial bus (USB) memory for storing the computer program 531. Alternatively, the computer program 531 may be stored in the HDD 53 when the computer 50 downloads the computer program 531 via a network such as the Internet.

According to the computer program 531, similarly to the remote driving system 1 in the first to fourth embodiments described above, it is possible to suppress the communication amount while suppressing the deterioration of the operability related to remote driving by the remote driving device 10. According to the computer program 531, the remote driving system 1 according to the first to fourth embodiments described above can be realized relatively easily.

Various modes of the present disclosure derived from the embodiments described above will be described below.

A remote driving system according to one mode of the present disclosure is a remote driving system for remotely driving a target vehicle. The remote driving system includes: an acquisition unit for acquiring operation information related to an operation of a steering wheel by a user who remotely drives the target vehicle; and a control unit for controlling, according to the operation information, a resolution and a frame rate of each of a plurality of cameras mounted on the target vehicle. When an operation amount of the steering wheel indicated by the operation information is relatively small, the control unit maintains or improves at least one of the resolution and the frame rate of a camera that captures an image of a front region of the target vehicle in a traveling direction among the cameras. When the operation information indicates that the steering wheel has been rotated to one of right and left and the operation amount is relatively large, the control unit maintains or improves at least one of the resolution and the frame rate of a camera that captures an image of a region of the one of right and left of the target vehicle among the cameras.

In the above-described embodiment, the "communication unit 26" corresponds to an example of "acquisition unit", the "image control unit 27" corresponds to an example of "control unit", the "steering information" corresponds to an example of "operation information", the "camera 21C" corresponds to an example of "camera that captures an image of a front region of the target vehicle in a traveling direction", and "one of the camera 21L and the camera 21R" corresponds to an example of "camera that captures an image of a region of the one of right and left of the target vehicle".

In the remote driving system, when the operation amount is relatively small, the control unit may reduce at least one of the resolution and the frame rate of at least one camera other than the camera that captures the image of the front region in the traveling direction among the cameras. When the operation information indicates that the steering wheel has been rotated to the one of right and left and the operation amount is relatively large, the control unit may reduce at least one of the resolution and the frame rate of a camera that captures an image of the other of right and left of the target vehicle among the cameras. In the above-described embodiment, "the other of the camera 21L and the camera 21R" corresponds to an example of "camera that captures an image of the other of right and left of the target vehicle".

A remote driving system according to another mode of the present disclosure is a remote driving system for remotely driving a target vehicle. The remote driving system includes: an acquisition unit for acquiring turn signal information related to an operation of a turn signal lever by a user who remotely drives the target vehicle; and a control unit for controlling, according to the turn signal information, a resolution and a frame rate of each of a plurality of cameras mounted on the target vehicle. When the turn signal information indicates that the turn signal lever is not operated, the control unit maintains or improves at least one of the resolution and the frame rate of a camera that captures an image of a front region of the target vehicle in a traveling direction among the cameras. When the turn signal information indicates that the turn signal lever is operated such that a turn signal for one of right and left is operated, the control unit maintains or improves at least one of the resolution and the frame rate of a camera that captures an image of the one of right and left of the target vehicle among the cameras.

In the remote driving system, when the turn signal information indicates that the turn signal lever is not operated, the control unit may reduce at least one of the resolution and the frame rate of at least one camera other than the camera that captures the image of the front region in the traveling direction among the cameras. When the turn signal information indicates that the turn signal lever is operated such that the turn signal for the one of right and left is operated, the control unit reduces at least one of the resolution and the frame rate of at least a camera that captures an image of the other of right and left of the target vehicle among the cameras.

A remote driving system according to another mode of the present disclosure is a remote driving system for remotely driving a target vehicle. The remote driving system includes: an acquisition unit for acquiring gaze point information indicating a gaze point of a user who remotely drives the target vehicle; and a control unit for controlling, according to the gaze point information, a resolution and a frame rate of each of a plurality of cameras mounted on the target vehicle. When the gaze point information indicates that the user is gazing at front, the control unit maintains or improves at least one of the resolution and the frame rate of a camera that captures an image of a front region of the target vehicle in a traveling direction among the cameras. When the gaze point information indicates that the user is gazing at one of right and left, the control unit maintains or improves at least one of the resolution and the frame rate of a camera that captures an image of the one of right and left of the target vehicle among the cameras.

In the remote driving system, when the gaze point information indicates that the user is gazing at the front, the control unit may reduce at least one of the resolution and the frame rate of at least one camera other than the camera that captures the image of the front region in the traveling direction among the cameras. When the gaze point information indicates that the user is gazing at the one of right and left, the control unit may reduce at least one of the resolution and the frame rate of at least a camera that captures an image of the other of right and left of the target vehicle among the cameras.

A remote driving system according to another mode of the present disclosure is a remote driving system for remotely driving a target vehicle. The remote driving system includes: a detection unit for detecting an obstacle from an image captured by each of a plurality of cameras mounted on the target vehicle; and a control unit for controlling a resolution and a frame rate of each of the cameras according to a detection result of the obstacle detected by the detection unit. In the above-described embodiment, the "image control unit 27" corresponds to an example of "detection unit".

A control method according to one mode of the present disclosure is a control method of a remote driving system for remotely driving a target vehicle. The control method includes: an acquisition step for acquiring operation information related to an operation of a steering wheel by a user who remotely drives the target vehicle; and a control step for controlling, according to the operation information, a resolution and a frame rate of each of a plurality of cameras mounted on the target vehicle. In the control step, when an operation amount of the steering wheel indicated by the operation information is relatively small, at least one of the resolution and the frame rate of a camera that captures an image of a front region of the target vehicle in a traveling direction among the cameras is maintained or improved. In the control step, when the operation information indicates that the steering wheel has been rotated to one of right and left and the operation amount is relatively large, at least one of the resolution and the frame rate of a camera that captures an image of a region of the one of right and left of the target vehicle among the cameras is maintained or improved.

A control method according to another mode of the present disclosure is a control method of a remote driving system for remotely driving a target vehicle. The control method includes: an acquisition step for acquiring turn signal information related to an operation of a turn signal lever by a user who remotely drives the target vehicle; and a control step for controlling, according to the turn signal information, a resolution and a frame rate of each of a plurality of cameras mounted on the target vehicle. In the control step, when the turn signal information indicates that the turn signal lever is not operated, at least one of the resolution and the frame rate of a camera that captures an image of a front region of the target vehicle in a traveling direction among the cameras is maintained or improved. In the control step, when the turn signal information indicates that the turn signal lever is operated such that a turn signal for one of right and left is operated, at least one of the resolution and the frame rate of a camera that captures an image of the one of right and left of the target vehicle among the cameras is maintained or improved.

A control method according to another mode of the present disclosure is a control method of a remote driving system for remotely driving a target vehicle. The control method includes: an acquisition step for acquiring gaze point information indicating a gaze point of a user who remotely drives the target vehicle; and a control step for controlling, according to the gaze point information, a resolution and a frame rate of each of a plurality of cameras mounted on the target vehicle. In the control step, when the gaze point information indicates that the user is gazing at front, at least one of the resolution and the frame rate of a camera that captures an image of a front region of the target vehicle in a traveling direction among the cameras is maintained or improved. In the control step, when the gaze point information indicates that the user is gazing at one of right and left, at least one of the resolution and the frame rate of a camera that captures an image of the one of right and left of the target vehicle among the cameras is maintained or improved.

A control method according to another mode of the present disclosure is a control method of a remote driving system for remotely driving a target vehicle. The control method includes: a detection step for detecting an obstacle from an image captured by each of a plurality of cameras mounted on the target vehicle; and a control step for controlling a resolution and a frame rate of each of the cameras according to a detection result of the obstacle detected by the detection unit.

A computer program according to one mode of the present disclosure causes a computer constituting a remote driving system for remotely driving a target vehicle to function as: an acquisition unit for acquiring operation information related to an operation of a steering wheel by a user who remotely drives the target vehicle; and a control unit for controlling, according to the operation information, a resolution and a frame rate of each of a plurality of cameras mounted on the target vehicle. When an operation amount of the steering wheel indicated by the operation information is relatively small, the control unit maintains or improves at least one of the resolution and the frame rate of a camera that captures an image of a front region of the target vehicle in a traveling direction among the cameras. When the operation information indicates that the steering wheel has been rotated to one of right and left and the operation amount is relatively large, the control unit maintains or improves at least one of the resolution and the frame rate of a camera that captures an image of a region of the one of right and left of the target vehicle among the cameras.

A computer program according to another mode of the present disclosure causes a computer constituting a remote driving system for remotely driving a target vehicle to function as: an acquisition unit for acquiring turn signal information related to an operation of a turn signal lever by a user who remotely drives the target vehicle; and a control unit for controlling, according to the turn signal information, a resolution and a frame rate of each of a plurality of cameras mounted on the target vehicle. When the turn signal information indicates that the turn signal lever is not operated, the control unit maintains or improves at least one of the resolution and the frame rate of a camera that captures an image of a front region of the target vehicle in a traveling direction among the cameras. When the turn signal information indicates that the turn signal lever is operated such that a turn signal for one of right and left is operated, the control unit maintains or improves at least one of the resolution and the frame rate of a camera that captures an image of the one of right and left of the target vehicle among the cameras.

A computer program according to another mode of the present disclosure causes a computer constituting a remote driving system for remotely driving a target vehicle to function as: an acquisition unit for acquiring gaze point information indicating a gaze point of a user who remotely drives the target vehicle; and a control unit for controlling, according to the gaze point information, a resolution and a frame rate of each of a plurality of cameras mounted on the target vehicle. When the gaze point information indicates that the user is gazing at front, the control unit maintains or improves at least one of the resolution and the frame rate of a camera that captures an image of a front region of the target vehicle in a traveling direction among the cameras. When the gaze point information indicates that the user is gazing at one of right and left, the control unit maintains or improves at least one of the resolution and the frame rate of a camera that captures an image of the one of right and left of the target vehicle among the cameras.

A computer program according to another mode of the present disclosure causes a computer constituting a remote driving system for remotely driving a target vehicle to function as: a detection unit for detecting an obstacle from an image captured by each of a plurality of cameras mounted on the target vehicle; and a control unit for controlling a resolution and a frame rate of each of the cameras according to a detection result of the obstacle detected by the detection unit.

An applicable embodiment of the present disclosure is not limited to the above-described embodiment, and can be appropriately modified within the scope of the claims and within the scope not contrary to the gist or idea of the present disclosure that can be read from the entire specification. The remote driving system including such modifications is also included in the technical scope of the present disclosure.

What is claimed is:

1. A remote driving system for remotely driving a target vehicle, the remote driving system comprising:
   a memory storing a program; and
   a processor that executes the program to:
   acquire operation information related to an operation of a steering wheel by a user who remotely drives the target vehicle; and
   control, according to the operation information, a resolution and a frame rate of each of a plurality of cameras mounted on the target vehicle, wherein:
   when an operation amount of the steering wheel indicated by the operation information is relatively small, maintain or improve at least one of the resolution and the frame rate of a camera that captures an image of a front region of the target vehicle in a traveling direction among the cameras; and
   when the operation information indicates that the steering wheel has been rotated to one of right and left and the operation amount is relatively large, maintain or improve at least one of the resolution and the frame rate of a camera that captures an image of a region of the one of right and left of the target vehicle among the cameras.

2. The remote driving system according to claim 1, wherein:
   when the operation amount is relatively small, the processor reduces at least one of the resolution and the frame rate of at least one camera other than the camera that captures the image of the front region in the traveling direction among the cameras; and
   when the operation information indicates that the steering wheel has been rotated to the one of right and left and the operation amount is relatively large, the processor reduces at least one of the resolution and the frame rate of a camera that captures an image of the other of right and left of the target vehicle among the cameras.

3. The remote driving system according to claim 1, wherein the processor detects an obstacle from the image captured by each of the plurality of cameras mounted on the target vehicle; and
   controls the resolution and the frame rate of each of the cameras according to a detection result of the obstacle.

4. A remote driving system for remotely driving a target vehicle, the remote driving system comprising:
   a memory storing a program; and
   a processor that executes the program to:
   acquire turn signal information related to an operation of a turn signal lever by a user who remotely drives the target vehicle; and
   control, according to the turn signal information, a resolution and a frame rate of each of a plurality of cameras mounted on the target vehicle, wherein:
   when the turn signal information indicates that the turn signal lever is not operated, maintain or improve at least one of the resolution and the frame rate of a camera that captures an image of a front region of the target vehicle in a traveling direction among the cameras; and
   when the turn signal information indicates that the turn signal lever is operated such that a turn signal for one of right and left is operated, maintain or improve at least one of the resolution and the frame rate of a camera that captures an image of the one of right and left of the target vehicle among the cameras.

5. The remote driving system according to claim 4, wherein:

when the turn signal information indicates that the turn signal lever is not operated, the processor reduces at least one of the resolution and the frame rate of at least one camera other than the camera that captures the image of the front region in the traveling direction among the cameras; and when the turn signal information indicates that the turn signal lever is operated such that the turn signal for the one of right and left is operated, the processor reduces at least one of the resolution and the frame rate of at least a camera that captures an image of the other of right and left of the target vehicle among the cameras.

6. A remote driving system for remotely driving a target vehicle, the remote driving system comprising:
a memory storing a program; and
a processor that executes the program to:
acquire gaze point information indicating a gaze point of a user who remotely drives the target vehicle; and
control, according to the gaze point information, a resolution and a frame rate of each of a plurality of cameras mounted on the target vehicle, wherein:
when the gaze point information indicates that the user is gazing at front, maintain or improve at least one of the resolution and the frame rate of a camera that captures an image of a front region of the target vehicle in a traveling direction among the cameras; and
when the gaze point information indicates that the user is gazing at one of right and left, maintain or improve at least one of the resolution and the frame rate of a camera that captures an image of the one of right and left of the target vehicle among the cameras.

7. The remote driving system according to claim 6, wherein:
when the gaze point information indicates that the user is gazing at the front, the processor reduces at least one of the resolution and the frame rate of at least one camera other than the camera that captures the image of the front region in the traveling direction among the cameras; and
when the gaze point information indicates that the user is gazing at the one of right and left, the processor reduces at least one of the resolution and the frame rate of at least a camera that captures an image of the other of right and left of the target vehicle among the cameras.

* * * * *